United States Patent [19]
Aldred et al.

[11] Patent Number: 5,806,442
[45] Date of Patent: Sep. 15, 1998

[54] APPARATUS FOR FEEDING SOLID WASTES INTO A ROTARY KILN

[75] Inventors: Ernie Aldred, Hudson; Ronald Birchard, Beaconsfield; Donald Courtney, Newcastle; Jacques Denizeau, Longueuil; Christian Gagnon, La Prairie; Jean-Claude Normandin, Bromont, all of Canada

[73] Assignee: Lafarge Corporation, Reston, Va.

[21] Appl. No.: 365,918

[22] Filed: Dec. 29, 1994

Related U.S. Application Data

[63] Continuation-in-part of Ser. No. 210,708, Mar. 18, 1994, abandoned.
[51] Int. Cl.$^6$ .................................................. A47J 36/00
[52] U.S. Cl. ...................... 110/246; 110/118; 110/255; 110/226; 432/108; 432/117
[58] Field of Search ................. 110/226–229, 246, 110/255, 118, 32; 432/105, 106, 108, 117, 121, 239; 193/35, 35 A; 198/459.6, 463.4, 530, 531

[56] References Cited

U.S. PATENT DOCUMENTS

| | | | |
|---|---|---|---|
| 752,848 | 2/1904 | Moffert et al. | 193/33 |
| 3,742,875 | 7/1973 | Eberle . | |
| 4,551,051 | 11/1985 | Hofbauer et al. | 414/21 |

*Primary Examiner*—Henry A. Bennett
*Assistant Examiner*—Susanne C. Tinker
*Attorney, Agent, or Firm*—Thompson Hine & Flory LLP

[57] ABSTRACT

A feeding apparatus for feeding whole tires into a cement kiln comprising a feed opening in the shell of the kiln, a passageway including a sleeve extending within and outside the kiln, an arcuate sector valve device for closing the passageway and timed to open so as to allow the tires to fall into the kiln through the passageway. The sector valve having an outer perforated wall and an inner wall, the perforated wall allowing ambient air to circulate between the outer and inner wall to keep the outer wall cool for contact with the tires. A transfer device is provided for transferring the tires onto the feeding apparatus wherein the transfer device includes fingers while the feeding apparatus includes a fork receiving tray interdigitated with the fingers to pick up the tires as the kiln rotates.

7 Claims, 5 Drawing Sheets

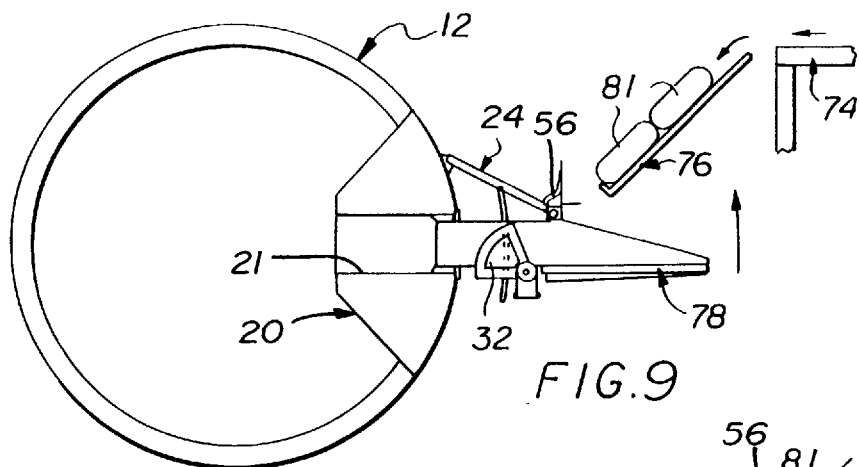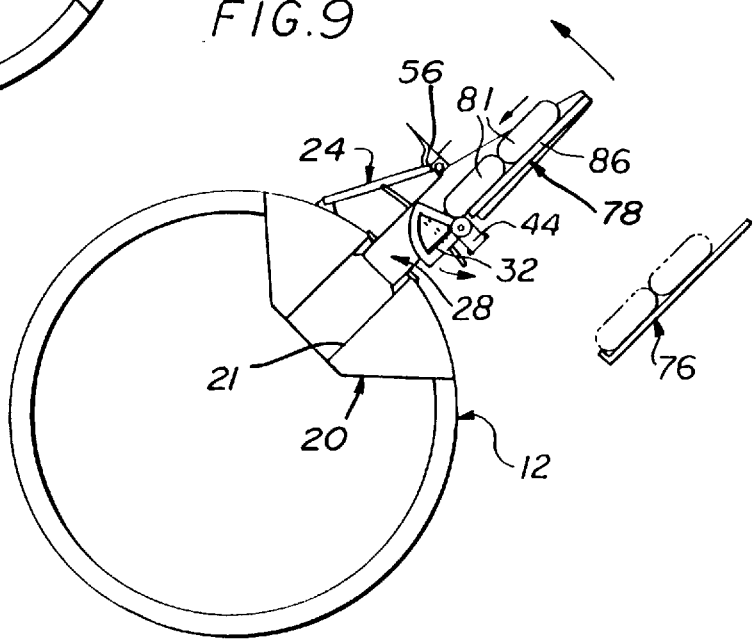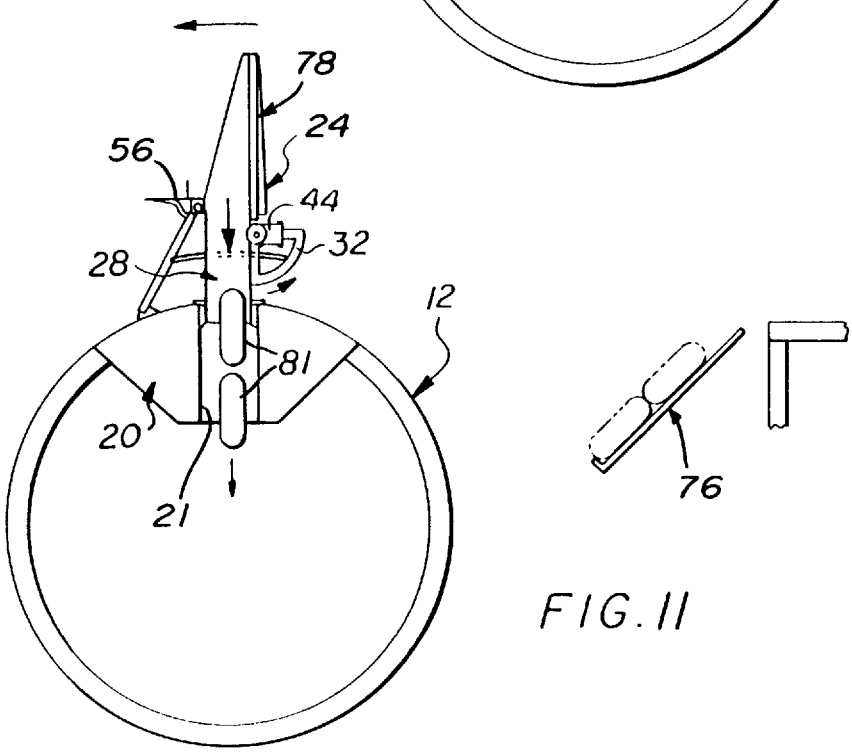

APPARATUS FOR FEEDING SOLID WASTES INTO A ROTARY KILN

CROSS-REFERENCE TO RELATED APPLICATION

This application is a C-I-P application of application Ser. No. 08/210,708, filed Mar. 18, 1994, now abandoned.

BACKGROUND OF THE INVENTION

The present invention relates to devices for burning solid wastes in rotary kilns and more particularly, to devices for injecting tires through the shell wall of rotary kilns.

The problem of disposal of scrap tires, typically from automotive use, is a growing one. At present, approximately 240 million scrap tires are generated each year in the United States and 25 million in Canada. The problem of tire disposal is compounded by the fact that may landfills are now refusing to accept whole scrap tires. Consequently, scrap tires must first be shredded or chipped in order to be accepted by landfills, which is a costly process and requires expensive chipping machinery.

An alternative is to burn the scrap tires whole. A preferred environment for burning scrap tires is a cement kiln, since material temperatures within the kiln typically reach 1594° C. (290020 F.)—sufficient to break down the constituents of the tires. A preferred zone of a rotary cement kiln for burning whole tires is the calcining zone where the material temperatures range from between 538.2° C. (1000° F.) to 1094.2° C. (2000° F.), or further down kiln at the beginning of the burning zone where temperatures are between 1094.2° C. (2000° F.) and the maximum expected temperatures of 1594° C. (2900° F.). A preferred zone of installation is where material temperature is above 760° C. (1400° F.) and less than 816.2° C. (1500° F.) and gas temperature comprised between 1205.4° C. (2200° F.) and 1594° C. (2900° F.). Temperatures too close to 1594° C. (2900° F.) could produce excessively rapid burning which would create a reducing atmosphere in the clinkering zone that could adversely affect the quality of the clinker produced by the kiln. Lower temperatures could result in slower ignition and burning incomplete combustion which can give off airborne pollutants.

Tire burning methods such as those disclosed in Tsuda U.S. Pat. No. 4,256,503, which include depositing whole tires in the precalcining zone or the cooling zone, both at the ends of the rotary kiln, are less desirable for this reason.

However, attempts have been made to charge a rotary kiln with whole tires directly through the shell wall in the calcining zone. An example of such a device is shown in Tutt, et al, U.S. Pat. No. 5,078,594. That patent discloses a device for charging whole tires into a cement kiln which includes a radially extending drop tube that projects inwardly from the shell wall, and an external closure which includes spring-loaded gates that open, when the device is at the 12 o'clock position, to allow a tire retained within the closure to travel through the drop chute onto the material within the cement kiln. A disadvantage with this type of design is the fact that the gate timing is fixed once the kiln is in operation and drop position and gate open time is not adjustable. Another limitation is the location of that device to feed into a cooler zone of the kiln, limiting heat release, complete combustion and tire substitution rate.

Accordingly, there is a need for an apparatus fully adjustable while the kiln is in operation as to the valve open position and duration, and which is able to withstand higher temperatures.

SUMMARY OF INVENTION

A construction in accordance with the present invention comprises an apparatus for feeding solid wastes into a cement kiln having an elongated tubular shell rotatable on its axis comprising a feed opening defined in the shell intermediate the ends of the tubular shell, a solid waste feeding assembly including a sleeve extending through the opening and forming a passageway having a radial axis with a first portion projecting into the interior of the kiln and a second portion exterior of the shell; the second portion of the sleeve including a substantially rectangular cross-section; a valve means in the second portion for closing and opening the passageway, the valve means including a gate pivotable about a first axis normal to the radial axis of the passageway and including a first planar wall extending in a plane including the pivot axis and a second wall joined to the first wall, the second wall being generated by a straight line parallel to the pivot axis whereby in a valve closed position the first wall closes off the passageway and the second wall extends across the passageway upstream of the first wall and in a valve open position the first and second walls are clear of the passageway.

In a more specific embodiment the second wall is perforated to allow circulation of ambient air between the first and second walls to cool the second wall.

In another aspect of the present invention, an apparatus for feeding solid wastes into a cement kiln having an elongated tubular shell rotatable on its axis comprising a feed opening defined in the shell intermediate the ends of the tubular shell, a solid waste feeding assembly including a sleeve extending through the opening and forming a passageway having a radial axis with a first portion projecting into the interior of the kiln and a second portion exterior of the shell; the first portion including a mound of refractory material formed within the interior of the kiln, the mound tapering to an apex spaced from the shell a distance greater than the height of the feedstock in the kiln when the mound is at the six o'clock position and a radial passageway is defined by the sleeve from the apex of the mound through to the second portion wherein the passageway has a cross-section sufficient to allow solid waste to be fed from the exterior of the shell into the kiln.

In a further aspect of the present invention an apparatus for feeding solid wastes for feeding solid wastes into a cement kiln having an elongated tubular shell rotatable on its axis comprising a feed opening defined in the shell intermediate the ends of the tubular shell, a solid waste feeding assembly including a sleeve extending through the opening and forming a passageway having a radial axis with a first portion projecting into the interior of the kiln and a second portion exterior of the shell; a delivery means to one side of the shell coincident with the general radial plane of the opening such that upon rotation of the kiln the second portion of the sleeve will be in an alignment position with the delivery means at one point in the rotational cycle of the kiln, that one point located in the quadrant between 3 o'clock and 12 o'clock in a counterclockwise rotation cycle of the kiln, the delivery means including a delivery tray and means for advancing the solid waste to the delivery tray, the delivery tray including a plurality of counterbalanced pivoting fingers with each finger balanced to be parallel and spaced to an adjacent finger and set at a slope angle sufficient to deliver the solid waste by gravity; stop means at the end of the fingers, the feed assembly on the shell of the kiln including a pick up means in the form of a fork wherein the fork includes elongated elements adapted to be interdigitated with the fingers of the delivery means when the pick up means passes the one point in the rotational cycle.

The present invention is an apparatus for feeding solid wastes such as tires through the shell wall of a rotary. kiln, preferably a cement kiln, so that the tires are dropped on the kiln load and are burned to provide a source of heat where heat is most needed. Preferably, the injection occurs at the end of the calcining zone, where gas temperatures range from about 1205 C.–1316.6° C. Consequently, the amount of convention fossil fuel needed for heating the cement raw feed is reduced and the environment benefits because used tires are eliminated.

The feed apparatus of the present invention is positioned relative to the kiln to feed tires to the interior of the kiln at a point at which the temperature is sufficient to minimize the amount of pollutants generated by the combustion of the tires. The mechanism of the present invention operates to feed tires continually to the interior of the kiln without significant loss of heat or material from within the kiln. While the preferred embodiment is designed particularly for the feeding of whole automotive tires, portions of large truck tires, light aircraft tires and the like into a kiln, other combustible material either containerized or in the form of relatively large pieces or bales, may be fed to the kiln by the apparatus of the present invention.

The present invention includes a frustopyramidal sleeve made entirely of refractory material and anchored to the inner kiln shell. In one embodiment the sleeve has a smooth outer surface and has an elliptical cross-section. A sleeve of this design resists heat better than sleeves having steel liners. The sleeve extends radially inwardly from the shell, having a height, when at the 6 o'clock position within the kiln, such that the radially inner end of the sleeve protrudes above the material in the kiln and prevents the kiln load to be at any time in contact with the opening gate. The sleeve is substantially self-supporting and includes a central, radially-extending elliptical passageway shaped to receive tires therethrough. The passageway inside the kiln is provided by a refractory cast injector sleeve which resists high temperature and abrasion from the material within the kiln.

The passageway includes a motorized sector valve or gate valve, mounted on the exterior of the kiln shell, which is actuated to close the passageway during normal operation and open as needed to admit a tire or tires to the kiln interior by gravity feed. The sector valve is vented for cooling purposes and is pivotally mounted within a metal housing attached to the exterior of the kiln shell. The sector valve includes two walls, one to seal the passageway and the other, which is vented to prevent overheating tires in contact with it, supports the tire to be fed and when it pivots open provides a sliding surface for tires entering the passageway when the first assembly is pivoted to open the passageway. A motor is provided to actuate the sector valve to open and close the material passageway rapidly. The motor action is directed by an exterior controller and the sector valve at other times is held in a predetermined position by a brake.

The preferred embodiment also includes a feeding component having a feed table which may be hand-loaded or automated to feed tires singly or in multiples as required by the kiln operator. The feeding component preferably includes a stationary presenting tray made of spaced rods shaped to hold a tire or tires to be fed, and the kiln-mounted housing includes a pickup tray made of spaced forks, aligned with the passageway. As the kiln rotates, the rods of the pickup tray pass upwardly between the rods of the presenting tray. Tires placed on the presenting tray are removed therefrom by the take-away tray and slide from the take-away tray through the open passageway and into the kiln interior by gravity as the kiln rotates the passageway before the take away tray passes through the 12 o'clock position.

In the automated embodiment of the present invention, the apparatus includes powered feed conveyors which deposit tires on the presenting tray. The conveyors preferably include automatic counting and weighing devices as well as all required sorting, orienting discarding, feed and storage devices to present tires as desired by the kiln operation.

Accordingly, it is an object of the present invention to provide an apparatus for the continuous feeding of one or more whole tires at a time into a rotary kiln through the kiln wall, thereby reducing the need to dispose of used tires in landfills and in other environmentally undesirable methods; an apparatus for burning whole tires in a cement kiln which reduces the amount of fossil fuel burned in the kiln to manufacture Portland cement; an apparatus having a radially-oriented internal sleeve made of refractory and of sufficiently low profile that it does not project substantially above the level of the material being processed within the kiln and yet does not allow material being treated to flow out of the kiln through the sleeve passageway; an apparatus in which the housing external to the kiln incorporates a motor-powered sector gate or valve to limit passage of gas or material in or out of the kiln and which is capable of rapid opening to admit tires by gravity to the kiln interior; an apparatus in which tires can be hand fed to the kiln or which can be fully automated so that personnel are not required to operate the apparatus adjacent to the kiln shell; and an apparatus which can be operated continuously with the kiln, is capable of receiving whole tires without preprocessing and is relatively easy to operate and maintain.

Other objects and advantages will be apparent from the following description and the accompanying drawings.

BRIEF DESCRIPTION OF THE DRAWINGS

FIGS. 9, 10 and 11 are schematic views, in section, of the mechanism of FIG. 7, showing the mechanism as the kiln rotates through a tire pickup and feed cycle.

DETAILED DESCRIPTION

Figure 1:
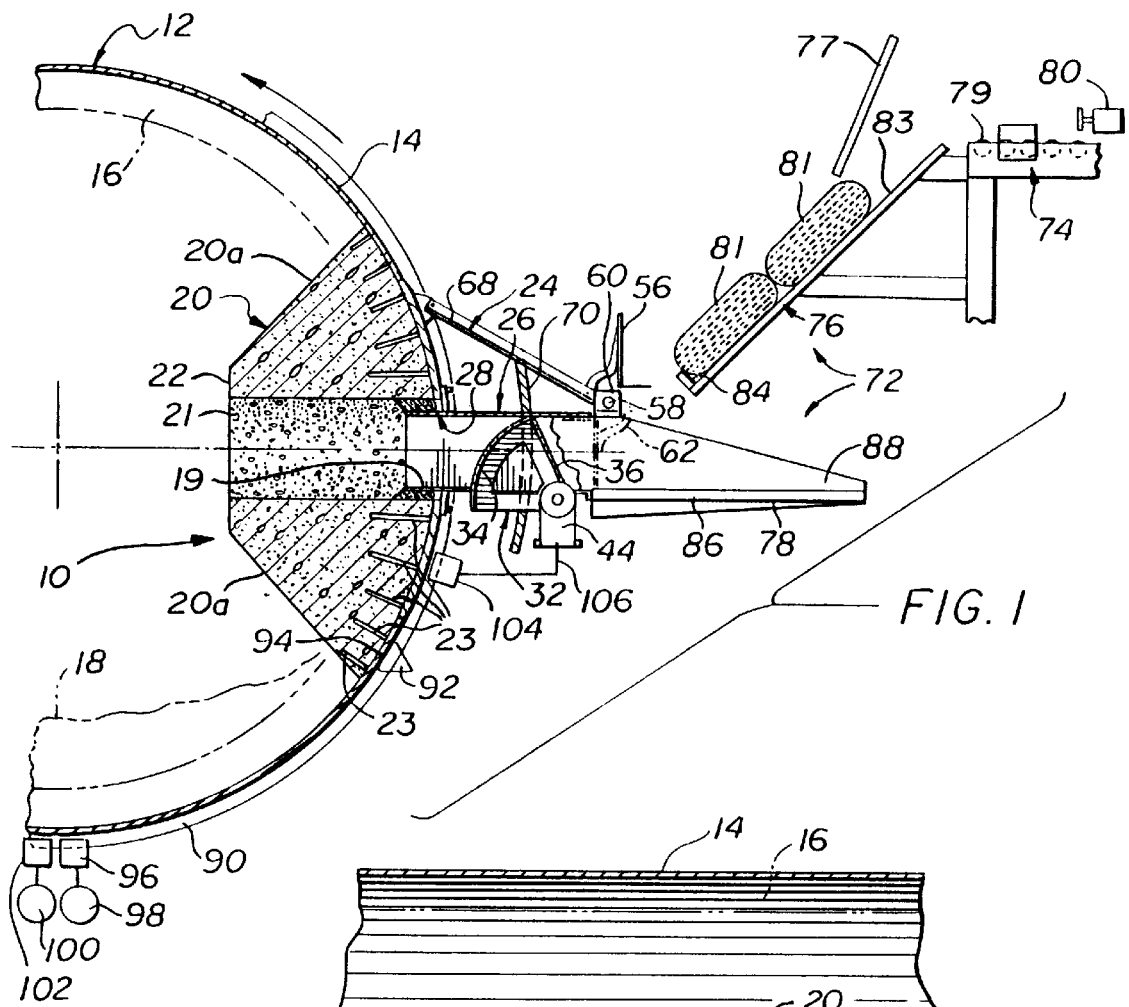
FIG. 1 is a fragmentary radial cross-section, of a cement kiln incorporating an embodiment of the present invention.
Figure 2:
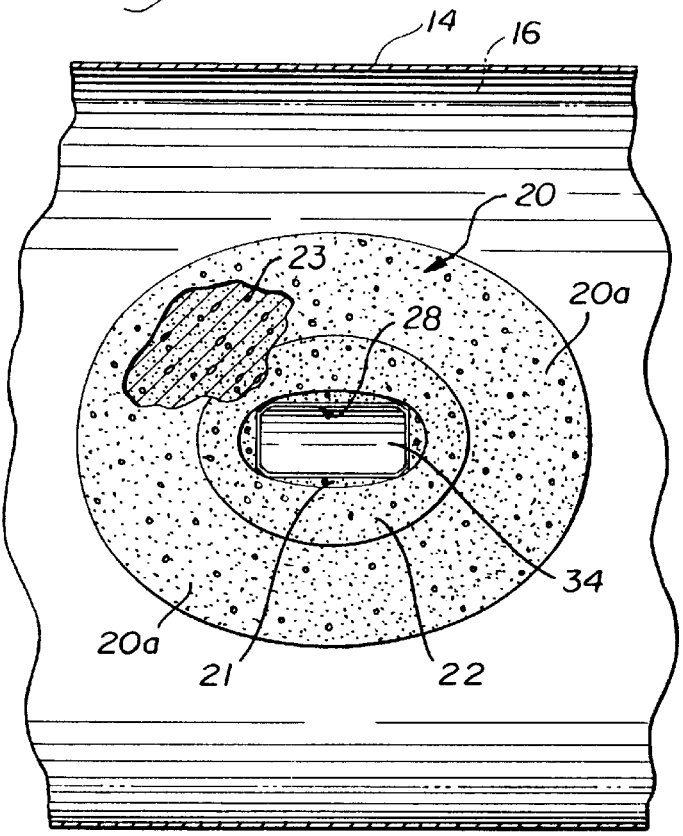
FIG. 2 is a detail of the interior kiln of FIG. 1 showing the sleeve partially broken away.

As shown in FIG. 1, the apparatus for feeding whole tires into a rotary kiln is generally designated 10 and is designed to be incorporated into a rotary kiln 12 having a shell 14 of good quality steel and an inner refractory liner 16. The shell 14 may be reinforced in order to carry the feed assembly 10. The kiln preferably is of the long variety and may not include a preheater. The feed assembly 10 preferably is positioned to feed tires 81 into the end of the calcining zone, where temperature range is from between about 2200° F. and 2400° F. (1204° C. and 1316° C.). Within the kiln 10 is a bed 18 of material which is heated and transformed into cement klinker by well-known means.

The kiln wall feed assembly 10 includes an aperture 19 in the shell 14 and sleeve 20, within the kiln coincident with the aperture 19, generally frustopyramidal and has an elliptical cross-section. The sleeve 20 is attached to the shell 14 by a plurality of anchors 23 which consist of stainless steel rods. The sleeve 20 is made of reinforced refractory material and includes an elliptical passageway 21 and a radially inner flat surface 22. The sleeve 20 is sized to protrude above the bed 18 of material when rotated to the 6o'clock position. The sleeve 20 has sloped smooth walls 20A with a somewhat elliptical cross-section in the axial direction wherein the major axis of the ellipse is parallel to the longitudinal axis of the kiln 12. This design permits the material 18 to flow past the sleeve 20 with a minimum of obstruction. Furthermore, the formation of the sleeve 20 constructed mostly of refractory material allows the location of the sleeve 20 in areas of the kiln which are too hot for a conventional drop tube of the prior art. Thus, the sleeve 20 may be located slightly upstream of the calcining zone (in relation to the direction of the gases). It is believed that the ideal location for feeding tires into the kiln is in the hotter zone on the edge of the calcining zone rather than in the cooler calcining zone.

A housing, generally designated 24, is mounted on the exterior of the shell 14 and includes a sector valve assembly 26. Sector valve assembly 26 includes a stub sleeve 28 which extends within the sleeve 20 through an opening 30 in the shell 14.

Figure 5:
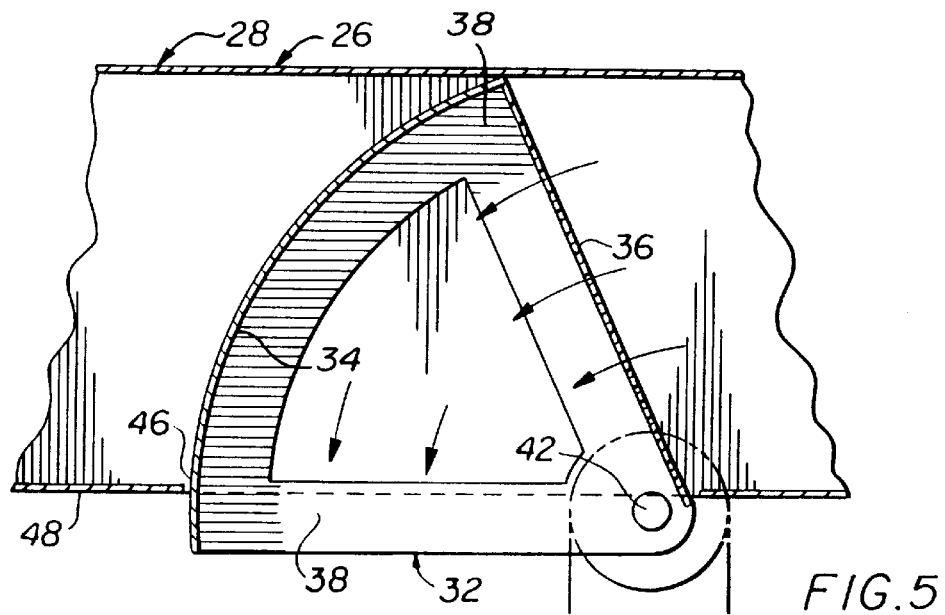
FIG. 5 is a detail of the mechanism of FIG. 1 showing the sector valve.
Figure 3:
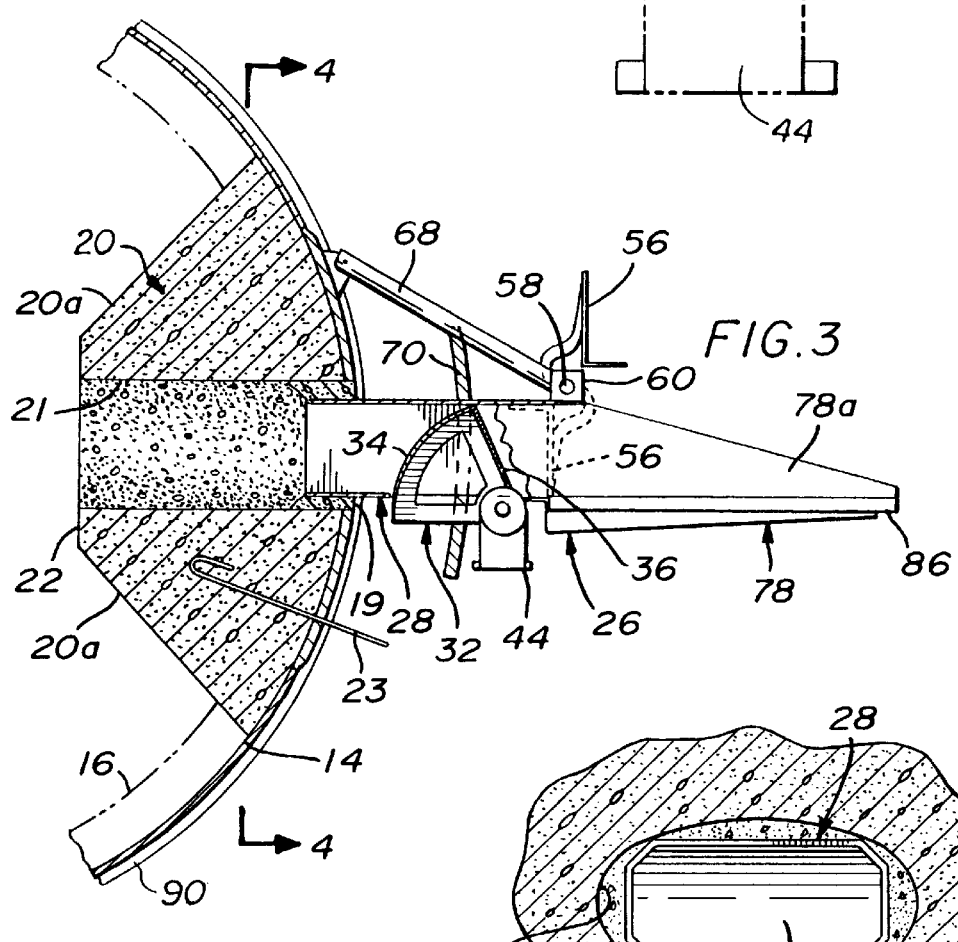
FIG. 3 is an enlarged schematic radial cross section of the embodiment shown in FIG. 1.
Figure 4:
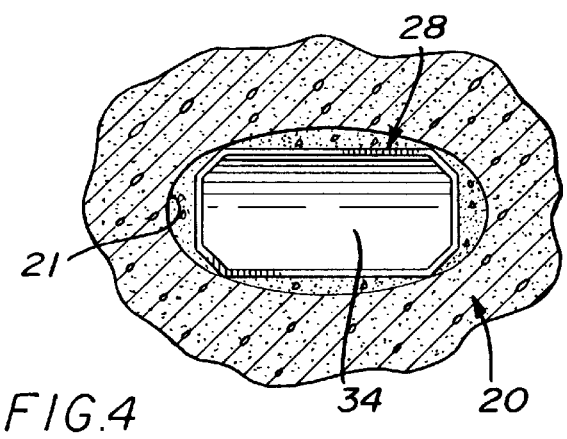
FIG. 4 is a fragmentary axial cross-section taken along lines 4—4 of FIG. 3.

A gate member 32 is mounted on the housing 24 and includes primary and secondary walls 34, 36. As shown in FIGS. 1, 3 and 5, primary wall 34 is arcuate in shape and secondary wall 36 is planar in shape. Primary and secondary walls 34, 36 are joined along lateral edge by wedge-shaped side walls 38. Secondary wall 36 is perforated to allow for air flow of ambient air through the area between primary and secondary walls 34, 36 for purposes of cooling primary wall 34 and secondary wall 36. The gate 32 when closed, prevents air from entering the sleeve 28 and thus the kiln 12.

Gate member 32 is mounted on a shaft 42 which, in turn, is mounted on a frame of housing 24 and is rotated by rotary motor 44. The bottom end of gate 32 is open. Gaps may be provided, such as gap 46 between the wall 48 of stub sleeve 28 and the primary wall 34, in order to allow some ambient air to enter the sleeve 28 along the wall 34 to reduce the temperature of the wall 34.

A secondary gate 56, shown in FIG. 3, is substantially L-shaped and is mounted for pivoting on axle 58 which in turn, is mounted on housing 24. Motor 60 pivots axle 58 so that door 56 is alternatively moved from the position shown in solid line in FIG. 1 (an opening configuration) to the position shown in phantom and designated 62 (a closed configuration) in which the stub sleeve 28 opening is closed upstream of the gate member 32. This secondary gate 56 is an emergency gate and would be used in the event that gate 32 becomes jammed or otherwise inoperable.

The housing 24 is supported in a generally radial configuration by struts 68. Heat shields 70 are also supported on the housing 24 to protect electronic components and motors from heat damage from the kiln 12.

Figure 7:
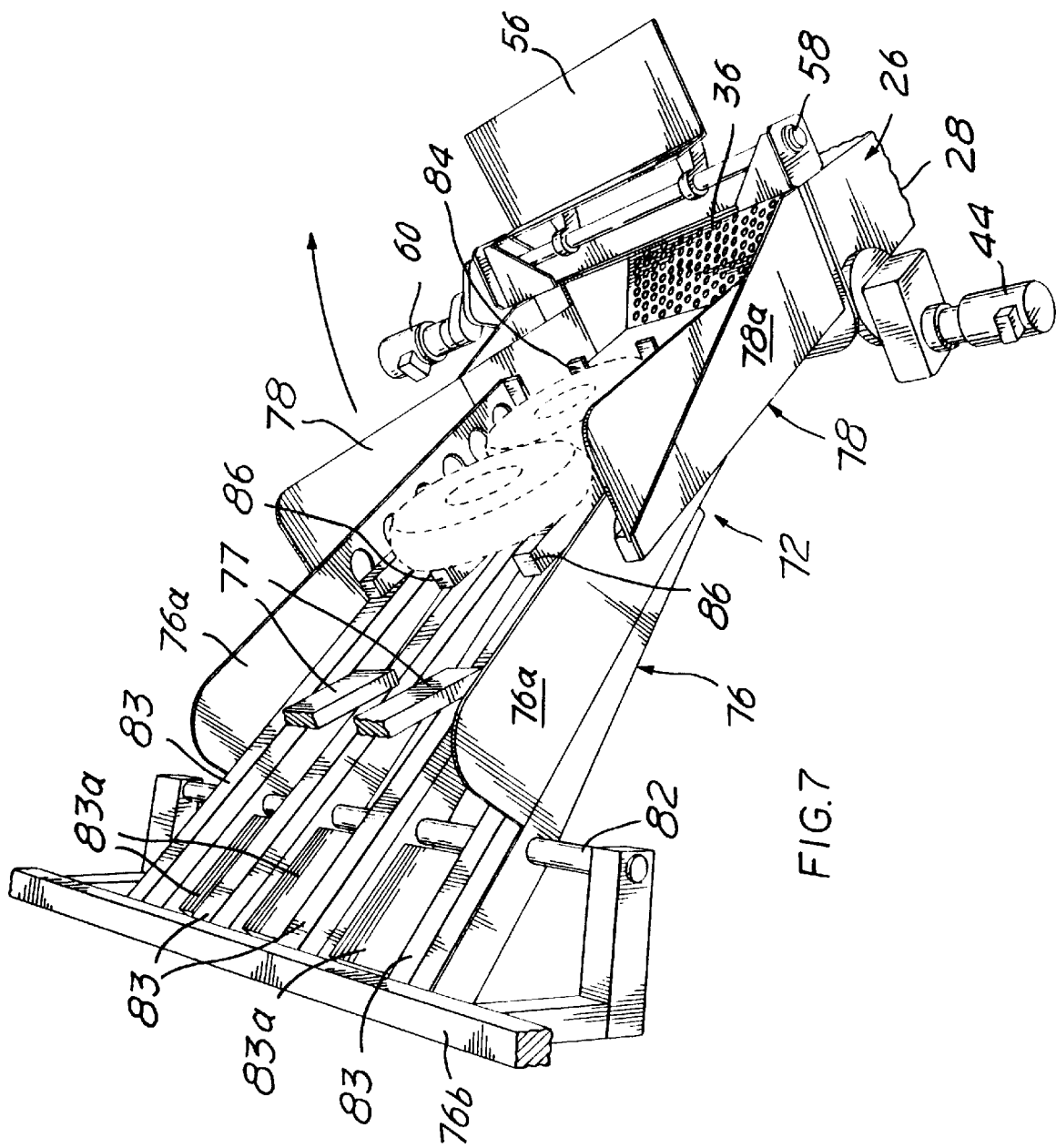
FIG. 7 is a fragmentary perspective view showing a detail of an embodiment of the present invention.

Also as shown in FIGS. 1 and 7, the apparatus 10 includes a tire feeding mechanism generally designated 72 which includes an accumulator conveyor 74 (FIG. 1), presentation tray 76 and takeup tray 78. The accumulator conveyor 74 includes a plurality of rollers 79, which in the preferred embodiment are driven rollers. Alternatively, the accumulator conveyor includes a reciprocating hydraulic cylinder motor 80 which is capable of pushing tires 81 which have accumulated on the rollers 76 forwardly from the accumulator conveyor 176. A sensor/controller detects the presence of tires on the conveyor 74 and activates the cylinder 80 to feed tires uniformly to tray 76 for a pick up. Guide bars 77 prevent the tires from tumbling down the tray 76.

The presentation tray 76 includes a plurality of spaced bars 83 which support the tires 81. The bars 83 are inclined to the horizontal sufficiently to allow the tires 81 to slide downwardly by gravity. The tires 81 are held on the presentation tray 76 by end fingers 84 which project upwardly from the ends of the tubes 82.

The bars 83 are pivoted about a shaft 82 and are balanced by counterweight 83A. Side panels 76A are located on the other bars 83. Thus, all of the bars 83 of the presentation tray 76 are counter levered and can pivot about the shaft 82 if these bars are struck by an object such as the presentation tray 76 in the event the forks 86 of the presentation tray 76 were misaligned.

Considerable damage can be avoided by this construction. The bars 83 are balanced at the proper angle to present the tires 81 by fine-tuning the counterweights 83A.

Guide bars 77 extend over the presentation tray 76 and serve to prevent the tires from tumbling as they are fed on the slope formed by the bars 83.

The takeup tray 78 includes a plurality of spaced forks 86 which are positioned to mesh with or pass between the spaced fingers 83 of the presentation tray 76 as the kiln 12 rotates counter clockwise. The forks 86 are mounted to the stub sleeve 28. Side panels 88 are provided to guide the tires into the sleeve 28.

As shown in FIG. 1, rings 90 (only one of which is shown) encircle the shell 14. Thermocouple 92 is mounted on the shell 14 and includes a sensor 94 which extends within the sleeve 20. Thermocouple 92 is connected to one of the slip rings 90 so that a signal is received by pick up 96 and conveyed to appropriate instrumentation 98 for recording and display. Electrical power is provided by control source 100 and is transmitted to another set of rings 90 by pick up 102. Electrical devices such as motor 44 include pick ups 104 which are connected to the slip rings 90 and transmit electrical power through conduits 106 to motor 44. This connection allows the timing of opening and closing of the gate 32 to be varied by remote control.

As shown in FIGS. 9 to 11 the procedure for feeding tires 81 into the kiln 12 is shown sequentially. In FIG. 9, the housing 24 is rotated counterclockwise by the kiln 12 so that the pick up tray 78 approaches the presentation tray 76, which has been loaded with tires 81 from accumulator conveyor 74. At this time, the gate member 32 is pivoted to the closed configuration shown.

Figure 8:
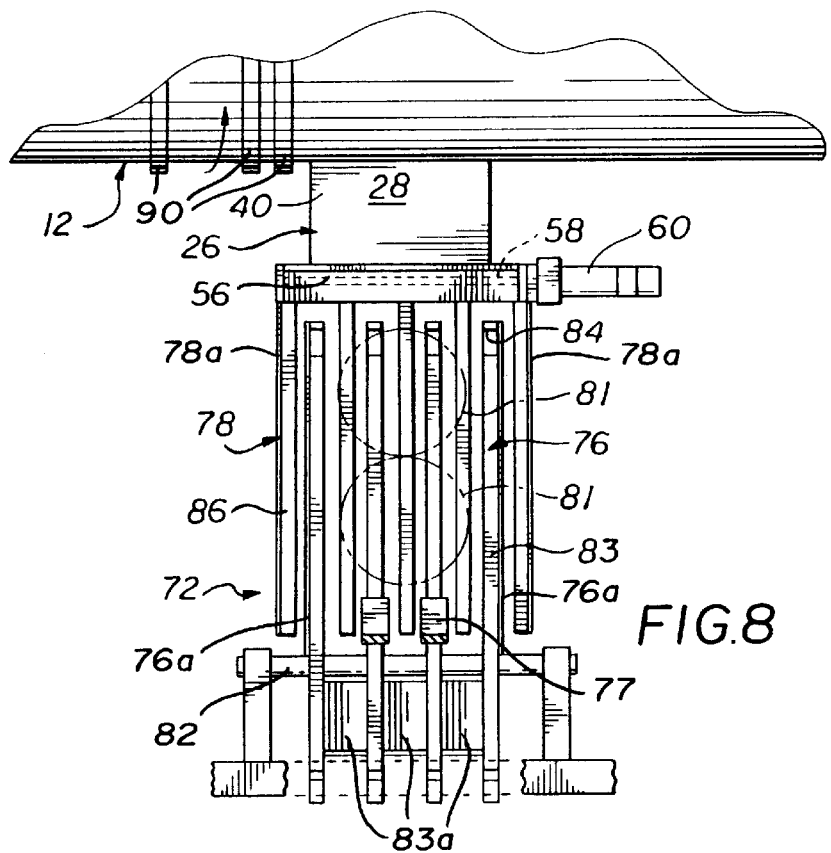
FIG. 8 is a schematic top plan view showing the engagement of the presentation and pickup trays of the embodiment of FIG. 7.
Figure 6:
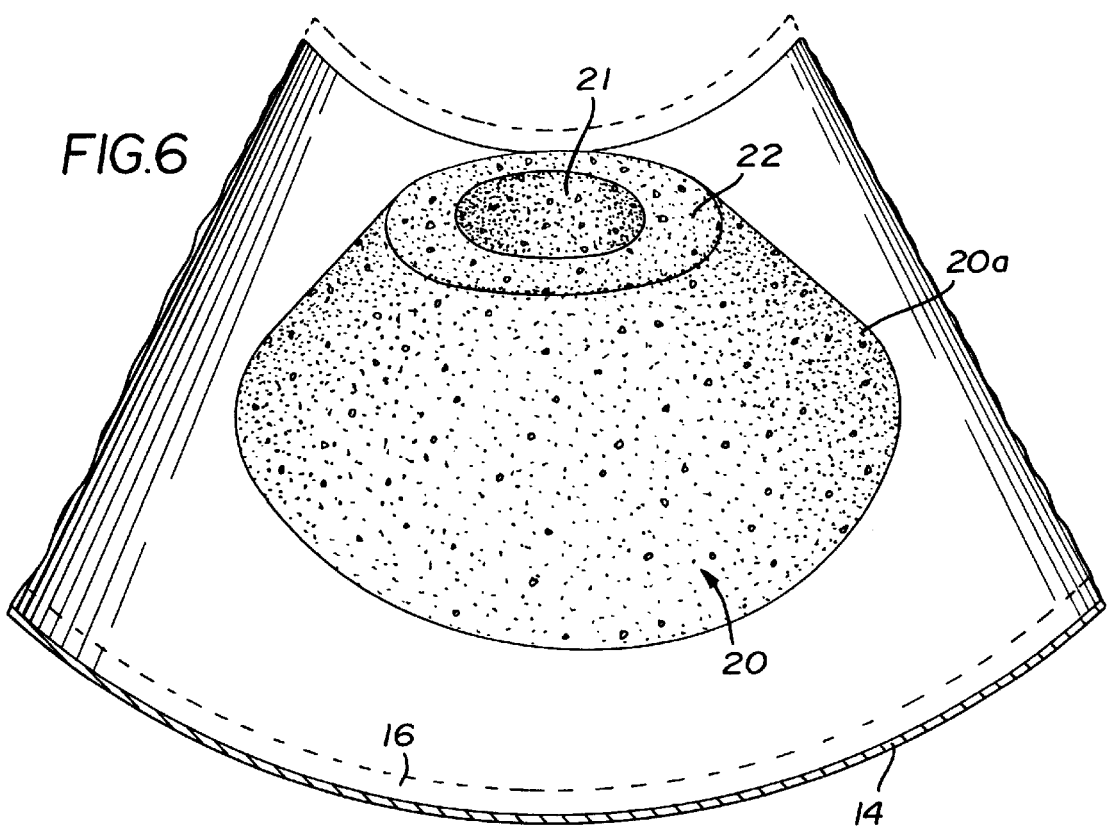
FIG. 6 is a fragmentary perspective view of a further detail of the present invention.

As the pick up tray 78 passes upwardly through the presentation tray 76, as shown also in FIG. 8, the tires 81 are transferred from the presentation tray 76 to the pick up tray 78. As the housing 24 continues to rotate upwardly, the force of gravity causes the tires 81 to begin sliding along the pick up forks 86 and toward stub sleeve 28. The motor 44 is actuated by a control 100, to pivot the gate member 32 to an open configuration, at which time the secondary wall 36 is aligned such that is co-planar with the bottom wall of the stub sleeve 28 (see FIG. 11).

As shown in FIG. 11, with the gate member 32 in this position, the tires 81 are free to slide radially into the interior of the kiln 12 through the stub sleeve 28 and passageway 21 of the refractory sleeve 20. Once the housing 24 has swept past a preselected position (between 11 and 12 o'clock), the motor 44 is actuated by control 100 to pivot the gate member 32 to the closed configuration shown in FIG. 9. The gate member 32 remains in the closed position throughout the remainder of the rotation of the kiln 12, until once again it sweeps through and past the presentation tray 76.

The sleeve 20 preferably is sized such that, when the sleeve is at the 6 o'clock position, the radially inner end 22 protrudes above the material in the bed 18 of the kiln (approximately 4 feet or 1.2 meters). This minimizes the amount of material that may fall through the sleeve opening and contact the stub sleeve 28 and gate member 32. While the preferred embodiment shows a sleeve 20 which is substantially radial in orientation, it is within the scope of the invention to provide tangentially-angled sleeves.

While the forms of apparatus herein described constitute preferred embodiments of the invention, it is to be understood that the invention is not limited to these precise forms of apparatus and that changes may be made therein without departing from the scope of the invention.

We claim:

1. An apparatus for feeding solid wastes into a cement kiln having an elongated tubular shell rotatable on its axis comprising a feed opening defined in the shell intermediate the ends of the tubular shell, a solid waste feeding assembly including a sleeve extending through the opening and forming a passageway having a central axis extending radially out of the tubular shell, with a first portion projecting into the interior of the kiln and a second portion exterior of the shell; the second portion of the sleeve including a substantially rectangular cross-section; a valve means in the second portion for closing and opening the passageway, the valve means including a gate pivotable about a first axis normal to the central axis of the passageway and including a primary wall extending in a plane including the pivot axis and a secondary wall joined to the primary wall, the secondary wall defining a curve generated by a straight line parallel to the pivot axis, one of the primary and secondary walls being located upstream of the other relative to the passageway and being perforated to allow circulation of ambient air between the primary and secondary walls to cool the walls, whereby in a valve closed position the other of the primary and secondary walls, located downstream relative to the passageway, closes off the passageway and the wall located upstream extends across the passageway, and in a valve opened position the primary and secondary walls are clear of the passageway.

2. The apparatus as defined in claim 1 wherein motor means are provided to rotate the valve means between a valve opened and a valve closed position and control means are provided for operating the pivoting of the valve means to a valve open position as the feeding assembly in the feed opening of the rotating kiln approaches the 12 o'clock position and the control means causes the valve means to move from the valve open position to the valve closed position as the feed opening in the kiln moves away from the 12 o'clock position.

3. The apparatus as defined in claim 1 wherein the solid waste feeding assembly includes a pick up tray for receiving whole tires to be burned, the pick up tray is upstream of the valve means and aligned with the passageway so that when whole tires are picked up by the pick up tray, the whole tires abut against the perforated wall of the valve means when the valve means is in a closed position and the whole tires pass into the kiln through the passageway when the valve means is in a valve opened position.

4. An apparatus as defined in claim 2 wherein an electrical conduit ring is provided on the outer surface of the shell near the feed assembly such that the control means is in communication with the motor driving the valve means.

5. A feed assembly kit for installation on a rotary long cement kiln wherein an opening is provided in the shell of the kiln, the feed assembly kit including a solid waste feeding assembly having a sleeve to extend through the opening and to form a passageway having a central axis with a first portion projecting into the interior of the kiln and a second portion exterior of the shell; the second portion of the sleeve including a substantially rectangular cross-section; a valve means in the second portion for closing and opening the passageway, the valve means including a gate pivotable about a first axis normal to the central axis of the passageway and including a planar wall extending in a plane including the pivot axis and a curved wall joined to the planar wall, the curved wall being generated by a straight line parallel to the pivot axis, the planar wall being perforated to allow circulation of ambient air between the walls whereby, in a valve closed position, the curved wall closes off the passage and the planar wall extends across the passage upstream of the curved wall and in a valve opened position the walls are clear of the passageway; the first portion of the sleeve including a mound of refractory material which is formed within the interior of the kiln, the mound tapering to an apex spaced from the shell a distance greater than the height of the feed stock in the kiln when the mound is at the 6 o'clock position and a radial passageway is defined by the sleeve from the apex of the mound through the second portion wherein the passageway has a cross-section sufficient to allow solid waste to be fed from the exterior of the shell into the kiln and a delivery system is provided to be mounted to one side of the shell coincident with the general radial plane of the opening such that upon rotation of the kiln the second portion of the sleeve will be in an aligned position with the delivery means at one point in the rotational cycle of the kiln, that one point located in the quadrant preceding 12 o'clock in the direction of rotation of the kiln when the kit is assembled and the kiln is rotating, the delivery means including a delivery tray and means for advancing the solid waste to the delivery tray, the delivery tray including a plurality of counterbalanced pivoting fingers with each finger balanced to be parallel and spaced to an adjacent finger and set at a sloped angle sufficient to deliver the solid waste by gravity; stop means at the end of the fingers, the feed assembly forming part of the kit including a pick up means in the form of a fork wherein the fork includes elongated elements adapted to be interdigitated with the fingers of the delivery means when the pick up means passes the one point of the rotational cycle.

6. The apparatus as defined in claim 1, wherein the secondary wall is located downstream and the primary wall is located upstream and is perforated.

7. The apparatus as defined in claim 6 wherein the secondary wall is an arcuate panel, the center of curvature of which is the pivot axis.

* * * * *